United States Patent
Taber, III

(10) Patent No.: US 7,913,223 B2
(45) Date of Patent: Mar. 22, 2011

(54) METHOD AND SYSTEM FOR DEVELOPMENT AND USE OF A USER-INTERFACE FOR OPERATIONS, ADMINISTRATION, MAINTENANCE AND PROVISIONING OF A TELECOMMUNICATIONS SYSTEM

(75) Inventor: Bradley M. Taber, III, Rochester, MA (US)

(73) Assignee: Dialogic Corporation, Montreal, Quebec (CA)

( * ) Notice: Subject to any disclaimer, the term of this patent is extended or adjusted under 35 U.S.C. 154(b) by 1482 days.

(21) Appl. No.: 11/305,621

(22) Filed: Dec. 16, 2005

(65) Prior Publication Data

US 2007/0143739 A1 Jun. 21, 2007

(51) Int. Cl.
*G06F 9/44* (2006.01)
*G05B 11/01* (2006.01)
*G05B 19/42* (2006.01)
*G06F 3/00* (2006.01)

(52) U.S. Cl. ........ 717/106; 717/107; 717/109; 717/113; 700/17; 700/86; 700/87; 715/744; 715/760; 715/762; 715/765

(58) Field of Classification Search .................... 717/106
See application file for complete search history.

(56) References Cited

U.S. PATENT DOCUMENTS

| | | | | |
|---|---|---|---|---|
| 5,544,303 A | * | 8/1996 | Maroteaux et al. | 715/733 |
| 6,247,052 B1 | * | 6/2001 | Huang et al. | 709/224 |
| 6,714,217 B2 | * | 3/2004 | Huang et al. | 715/736 |
| 7,290,208 B2 | * | 10/2007 | Saborowski et al. | 715/234 |
| 7,464,367 B2 | * | 12/2008 | Wain et al. | 717/105 |
| 7,516,411 B2 | * | 4/2009 | Beaton et al. | 715/753 |
| 7,650,591 B2 | * | 1/2010 | Bau | 717/116 |
| 2002/0085020 A1 | * | 7/2002 | Carroll, Jr. | 345/700 |
| 2003/0025732 A1 | * | 2/2003 | Prichard | 345/765 |
| 2005/0229158 A1 | * | 10/2005 | Thusoo et al. | 717/115 |
| 2006/0101253 A1 | * | 5/2006 | Rapp et al. | 712/228 |

* cited by examiner

*Primary Examiner* — Thomas K Pham
(74) *Attorney, Agent, or Firm* — Weingarten, Schurgin, Gagnebin & Lebovici LLP

(57) ABSTRACT

An extensive and powerful XML meta-data rule-based language and system for developing a use-interface for configuring, monitoring and provisioning a telecommunications system is provided. The language is based on rules that define configuration objects and relationships. The rules are organized into files that define the individual objects used to configure the telecommunications system. The rules are interpreted at run-time to instruct the system to present appropriate user-interface controls to create, edit, and manipulate the objects. The rules will direct the specific editor for objects' properties, sometimes consisting of edit controls, combo box controls, multiple selection controls, or dialog boxes for IP addresses, point codes, or dates. The rules can enforce dependencies and cardinalities, as well as display customized data tables across different objects. This powerful language has the capability of being updated while deployed to allow object definition updates without taking the telecommunications system down and re-compiling or re-installing software.

20 Claims, 24 Drawing Sheets

```
602  <XMLObject sClassName="Signaling" sDisplayName="Signaling" sConfigOrder="5">
604    <XMLObject sClassName="SS7" sDisplayName="SS7" sConfigOrder="6">
606      <XMLObject sClassName="SS7Stack_IMG" sDisplayName="SS7 Stack" sConfigOrder="7">
608        <XMLObject sClassName="SS7LinkSet" sDisplayName="SS7 Link Set" sConfigOrder="8">
610          <XMLObject sClassName="SS7Link" sDisplayName="SS7 Link" sConfigOrder="9">
             </XMLObject>
612          <XMLObject sClassName="SS7Route" sDisplayName="SS7 Route" sConfigOrder="9">
             </XMLObject>
           </XMLObject>
         </XMLObject>
614    <XMLObject sClassName="H323Signaling" sDisplayName="H323" sConfigOrder="6">
616      <XMLObject sClassName="H323Timers" sDisplayName="H323 Timers" sConfigOrder="7">
         </XMLObject>
       </XMLObject>
     </XMLObject>
```

| Main Rule Elements | Supporting Elements | Organizational Elements |
|---|---|---|
| xml_property.java<br>xml_byte_data_dialog.java<br>xml_combobox.java<br>xml_file_dialog.java<br>xml_ip_address_dialog.java<br>xml_offset_value_dialog.java<br>xml_order_dialog.java<br>xml_point_code_dialog.java<br>xml_url.java<br>xml_character_set_validation.java<br>xml_digit_string_validation.java<br>xml_gateway_validation.java<br>xml_pattern_match_validation.java<br>xml_uniqueness_validation.java | xml_apply_to.java<br>xml_attribute.java<br>xml_byte_count.java<br>xml_character_set.java<br>xml_children.java<br>xml_column.java<br>xml_common_set.java<br>xml_condition.java<br>xml_custom_class.java<br>xml_default_gateway.java<br>xml_descendants.java<br>xml_digit_string.java<br>xml_dynamic_choice.java<br>xml_dynamic_protocol_reference.java<br>xml_equals.java<br>xml_filter.java<br>xml_include.java | xml_combobox_rule.java<br>xml_rule.java |

FROM FIG. 7A

708 xml_attribute_override.java
xml_cardinality.java
xml_help.java
xml_sort_definition.java
xml_table.java
xml_wizard.java xml_input.java
xml_int_range.java
xml_in_set.java
xml_ip_address.java
xml_list.java
xml_normal_class.java
xml_object_generator.java
xml_output.java
xml_pattern_match.java
xml_range.java
xml_route_criteria.java
xml_route_criteria_order.java
xml_server_choice.java
xml_sort.java
xml_start_directory.java
xml_static_choice.java
xml_subnet_mask.java
xml_table_type.java
xml_translation_string.java
xml_unique.java
xml_validate_data.java
xml_value_generator.java
xml_virtual_class.java
xml_wizard_dialog.java

```
<property name="Primary" display_name="Primary/Secondary" default_value="Primary" read_only="False" mandatory="True" type="configure" visible="true"/>   ─── 804
<property name="Linkid" display_name="Link ID" default_value="" read_only="True" mandatory="False" type="configure" visible="true"/>   ─── 806
<property name="Span" display_name="Span" default_value="0xFFFFFFFE" read_only="False" mandatory="True" type="configure" visible="false"/>   ─── 808
<property name="Componentid" display_name="Interface - Offset" default_value="" read_only="False" mandatory="True" type="configure" visible="true"/>   ─── 810
<property name="Channel" display_name="Channel" default_value="" read_only="False" mandatory="True" type="configure" visible="true"/>
<property name="SignalingLinkCode" display_name="Signaling Link Code" default_value="" read_only="" mandatory="False" type="configure" visible="true"/>
<property name="DataRate" display_name="Data Rate" default_value="64 Kbps" read_only="False" mandatory="True" type="configure" visible="true"/>
<property name="ElectricalInterface" display_name="Electrical Interface" default_value="DS1 Channel" read_only="" mandatory="False" type="configure" visible="true"/>
<property name="LinkStatus" display_name="Link Status" default_value="" read_only="True" mandatory="False" type="monitor" visible="true"/>
<property name="Class" display_name="SS7Link" default_value="SS7Link" read_only="True" mandatory="True" type="configure" visible="false"/>
```

| SS7 Link 0 | As-Configured | User-Specified |
|---|---|---|
| Property | | |
| Primary/Secondary | | Primary |
| Link ID | | 0 |
| Interface - Offset | | Bearer - ID:0 |
| Channel | | 0 |
| Signaling Link Code | | |
| Data Rate | | 64 Kbps |
| Electrical Interface | | DS1 Channel |
| Link Status | | |

840 — Property
822 — Primary/Secondary
824 — Link ID
826 — Interface - Offset
828 — Channel
830 — Signaling Link Code
832 — Data Rate
834 — Electrical Interface
836 — Link Status 842 As-Configured    844 User-Specified

FIG. 8B

```
<combobox>
  <apply_to property="ComponentId"/>
  <dynamic_choice root_class="Node" class="TDM_DS1" property=""/>
</combobox>
```

1302

⊙ Facility
 ⊙ Bearer - ID:0
 ⊙ Bearer - ID:1
 ⊙ Bearer - ID:2
 ⊙ Bearer - ID:3
 ⊙ Bearer - ID:4
 ⊙ Bearer - ID:5

| SS7 Link 0 | | |
|---|---|---|
| Property | As-Configured | User-Specified |
| Primary/Secondary | | Primary |
| Link ID | | 0 |
| Interface - Offset | | Bearer - ID:0 ▽ |
| Channel | | Bearer - ID:0 |
| Signaling Link Code | | Bearer - ID:1 |
| Data Rate | | Bearer - ID:2 |
| Electrical Interface | | Bearer - ID:3 |
| Link Status | | Bearer - ID:4 |
| | | Bearer - ID:5 |

```
<cardinality>
<descendants class="Media" max="1"/>
<descendants class="NetworkInterfaces" max="1"/>
<descendants class="Facility" max="1"/>
<descendants class="Signaling" max="1"/>
<descendants class="RadiusClient" max="1"/>
<descendants class="TimingSyncPriorityList" max="1"/>
<descendants class="LicenseInfo" max="1"/>
</cardinality>
```

```
<attribute_override>
<apply_to property="PeerLogicalNodeId"/>
<condition class="SS7" property="RedundancyConfig">
  <equals value="StandAlone">
    <attribute read_only="true" default_value=""/>
  </equals>
  <equals value="Secondary">
    <attribute read_only="true" default_value=""/>
  </equals>
</condition>
</attribute_override>
```

FIG. 21

METHOD AND SYSTEM FOR DEVELOPMENT AND USE OF A USER-INTERFACE FOR OPERATIONS, ADMINISTRATION, MAINTENANCE AND PROVISIONING OF A TELECOMMUNICATIONS SYSTEM

BACKGROUND OF THE INVENTION

1. Field of the Invention

The present invention relates generally to telecommunications systems and, more particularly, to user interfaces for use with such systems.

2. Background Information

In rapidly evolving telecommunications environments, telecommunications service providers require increased flexibility, interoperability, redundancy and scalability. This rapid growth has created a demand for systems which are versatile and adaptable. Many systems interface with multiple carriers which integrate services such as messaging, conferencing, ring tones and ring back tones, prepaid voice/data and concierge services. Service providers employ Voice over Internet Protocol (VoIP) gateways, media servers and signaling gateways in order to provide advanced media capabilities, enabling both fixed and mobile providers to offer services across converged networks while reducing both capital and operational expenditures.

There are many different architectures that are used in information technology (IT) networks, as in telecommunications systems. Within those architectures, multiple customers are utilizing the services. Thus, service providers need to have the capability to configure each system efficiently, accurately and to customize that system in order to accommodate the variations from system to system.

Configuration, monitoring and supervision of any telecom network can be time consuming due to the large amount of information contained in the system. Performing configuration and oversight requires a robust and powerful user interface. However, creating a user interface can involve a laborious task that requires a skilled software engineer to write tens of thousands of lines of code which can take many months. A special skill set is required to write JAVA code, which is commonly used to develop a user interface that is suitable for a complex system that is required to run on multiple platforms. In addition to initially creating a user interface, the need also arises to dynamically update the system information once it has already been configured and deployed such as when system requirements or other parameters change. However, updates can require system downtime, and/or may require a re-boot of the system, which is costly, and often unacceptable from the customer's perspective.

There remains a need, therefore, for a method and associated software program for rapid development of a user interface for a complex system and a need for such a method and program which can be easily updated (without requiring a re-write of a large portion of code) and does not require a new software version, recompiling or system downtime.

SUMMARY OF THE INVENTION

The disadvantages of prior techniques are overcome by the present invention, which is a method and system for development and use of a user-interface for operations, administration, maintenance and provisioning (OAM&P) of a telecommunications system that uses an XML-driven user interface that is supported by a set of XML definition files that provide a representation of the telecommunications system. The definition files comprise a logical representation of configurable system objects that together describe the telecommunications system environment and which can be accessed through a user interface (UI) program in accordance with the invention. Through the graphic user interface (GUI) of the present invention a user can quickly determine, configure and modify the system objects to further define and make live updates to the telecommunications system.

In accordance with one aspect of the invention, XML code creates an object with several attributes. These attributes can then be displayed in a graphical user interface in a dialog box in which the user can specify selections for initial configuration of the system. The user interface also provides the user with the ability to make live updates to the system to change an aspect of the system as configured when necessary or desired. Configuration objects that represent physical or logical system components can be refined and utilized through rapid association, parsing, filtering and computations based on a selected property for a selected object. Providers can combine business specific configurations in a user interface with a hardware provider so that the system can be initially configured as desired by the particular business or service provider concerned.

In accordance with a telecommunication application of the invention, an integrated media gateway device, or a media services platform has physical objects which can be associated with higher level objects in order to subdivide various components of the system into any logical grouping. For example, a customer could maintain a view of assigned resources for each carrier it serves, or for each service it offers. This customization is performed in accordance with the invention using simple XML commands. This program can be readily incorporated into a larger software product for allowing customizing objects to fit the particular user's business specific applications and hardware.

The software engine of the present invention is supported by a set of XML-based object meta-data definition files that together form a logical representation of the entire telecommunications system environment. The logical representation in one embodiment is in a tree structure format. In addition, meta-data definition files describe the data relating to individual system objects, and set forth constraints on individual properties of those system objects. In addition, the definition files can be used to create system object rules that can be used to provide helpful user interface tools such as dialog boxes, wizards and customized tables. The definition files do not contain the actual data, but instead instruct the server associated with the telecommunications system to retrieve the data and further instruct and associated JAVA GUI process to display and edit the data in accordance with the instructions.

The present invention further provides that additional configuration objects can be added to the GUI at run time without recompiling the code in accordance with the invention. Using the code of the software program in the present invention, live updates can be performed or custom configuration objects can be added without taking a host system down or reinstalling the software thus avoiding system downtime.

In an illustrative embodiment, business specific configuration can be combined with the hardware provider's configuration data. Through the XML code, a business partner's configuration objects can digest the hardware provider's configuration objects and use the data in desired ways.

BRIEF DESCRIPTION OF THE DRAWINGS

The invention description below refers to the accompanying drawings, of which:

FIG. 6 is an example of a block of XML code defining an XML object hierarchy file in accordance with one embodiment of the present invention;

FIG. 7 is a table illustrating meta-data definition files in accordance with one embodiment of the present invention;

FIG. 8A is an example of a set of properties identified by the XML definition files in accordance with the present invention for a particular user interface;

FIG. 8B illustrates a GUI depicting the system properties defined by the definition rules of FIG. 8A;

FIGS. 12 through 14 are schematic illustrations which together describe how dynamic choice combo boxes are created in accordance with an illustrative embodiment of the present invention;

FIG. 19 is an example of the XML code for object rules in accordance with the definition files of the present invention;

FIG. 21 is an example of the XML code used for property overrides in accordance with the definition files of the present invention;

DETAILED DESCRIPTION OF AN ILLUSTRATIVE EMBODIMENT

System Background

Figure 1:
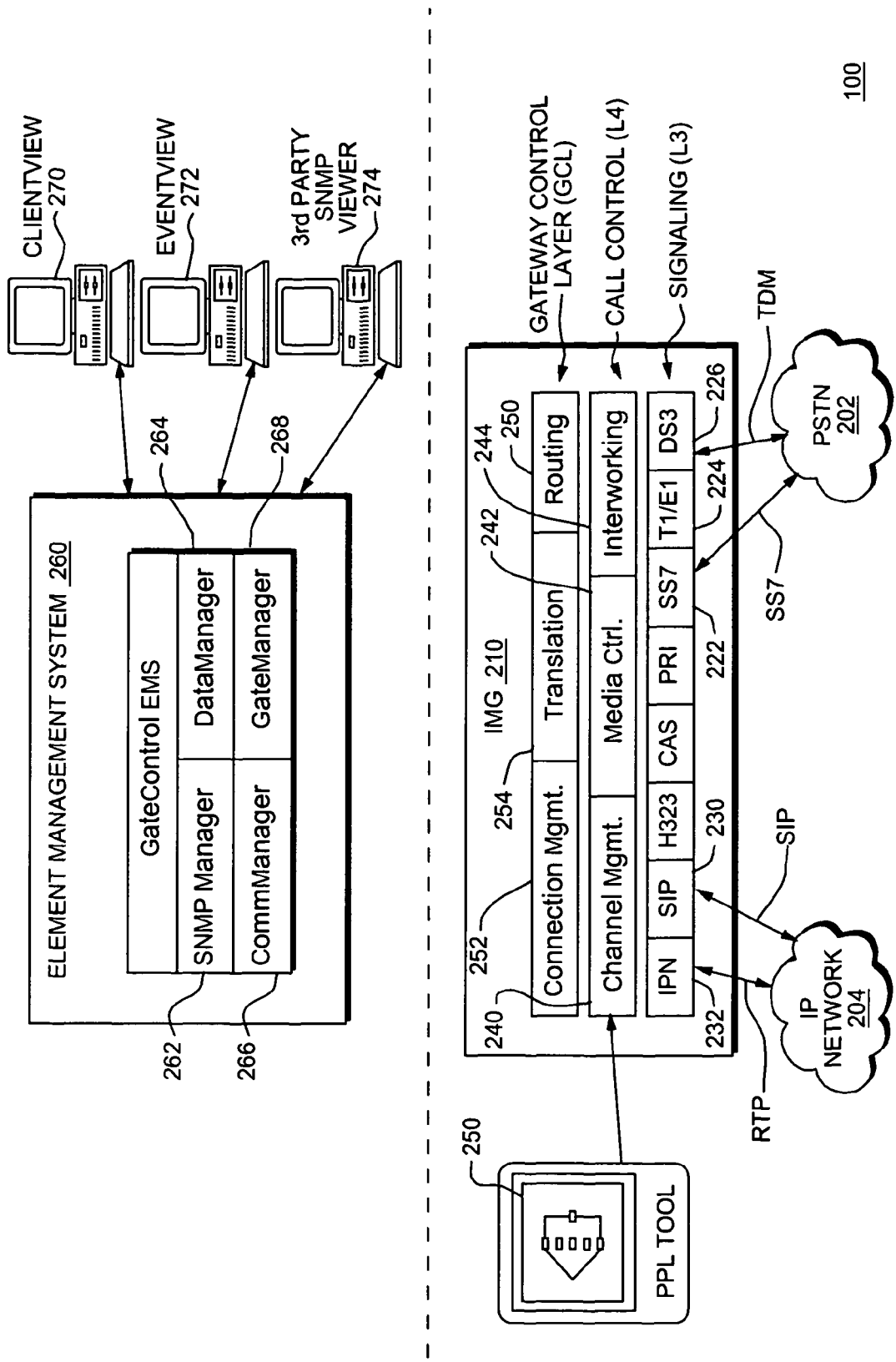
FIG. 1 is a schematic block diagram of a telecommunications services platform which may be configured, monitored and updated using the user interface in accordance with the present invention.

The invention described herein is readily adaptable for use with a variety of telecommunications switching systems and the scope of the invention is not limited to any particular architecture, or type of switching system. However, for purposes of illustration, one example of a portion of a telecommunications switching system with which the present invention may be employed is illustrated in FIG. 1. FIG. 1 shows a telecommunications environment 200 in which some calls, and/or portions of calls, are being processed via the PSTN 202, where other calls and/or portions of such other calls are being processed as VoIP calls over an IP network 204. An integrated media gateway (IMG) 210 and its OAM&P system, which is a gate control element management system 220 process information being transmitted between the PSTN 202 and the IP network 204. The integrated media gateway 210 includes a Signaling Layer 3 which includes for example ports processing incoming signaling data in SS7 protocol 222 or TDM signaling or voice and signaling data at T1 connectors 224 and E1 connectors 226, for example. The IP side of Signaling Layer 3 includes connectors for handling Session Initiation Protocol SIP packets 230 and RTP protocol packets 232. H323 (234), CAS (236) and PRI (238) calls can also be processed in the signaling layer 3 of the gateway 210. The Call Control Layer 4 includes a channel management module 240, Media Control module 242, and Interworking module 244. The PPL Tool 250 of the present invention is a software program which allows a user to control the behavior of the integrated media gateway 210. The gateway control layer 250 includes a connection management module 252, a translation module 254 and a routing module 256.

The application layer 260 has a gate control element management system. The GateControl Element Management System (GCEMS) is a user-friendly Graphical User Interface (GUI) for the IMG. Using the GCEMS, service providers can maintain and monitor a network of IMGs, and configure spans, channels, and SS7 links. System Administrators can also build inbound and outbound translation tables and set up advanced routing tables using the system. The GCEMS user interfaces consist of several subsystems, including EventView 274 and ClientView 270 and third party 274 user interfaces. The GCEMS GUI is Java-based and can run in both Linux® and Windows® environments. GCEMS runs on Dell (AC) or Augmentix (AC/DC NEBS-compliant) servers running Red Hat Enterprise 3.0 software, which is available from Excel Switching Corporation of Hyannis, Mass.

The GCEMS 260 servers include a SNMP module 262, a data manager module 264, a communications manager module 266 and a gate manager module 268. These servers are C++ based and run on the same hardware as GCEMS GUI. Hardware and software which may be used to implement an integrated media gateway of the type shown are available from Excel Switching Corporation of Hyannis, Mass.

As noted, the integrated media gateway described in FIG. 1, is an example of a gateway that may be configured, monitored and/or updated in accordance with the present invention as described in further detail herein. However, it should be understood that the inventive techniques may be readily employed with respect to many other telecommunications environments which may incorporate some or all of the embodiments described while remaining within the scope of the present invention and the invention is not limited to the particular illustration depicted in FIG. 1. It is also noted that the invention is not limited to telecommunications devices but instead is readily adaptable to other types of systems.

Creation of System Objects and Initial Configuration

As noted, a telecommunications switch or a gateway between telecommunications switches or central offices, contain many components (on the order of hundreds or thousands) that need to be configured when the device is to be initially brought into service. Thereafter, the initial configuration of the system may require further modification based upon changes in the system operation or system components. The system is also typically monitored during operation. All of these tasks require a user interface to the system. In accordance with the invention, a method for rapid development and use of a user interface for a telecommunications system is provided.

Figure 2:
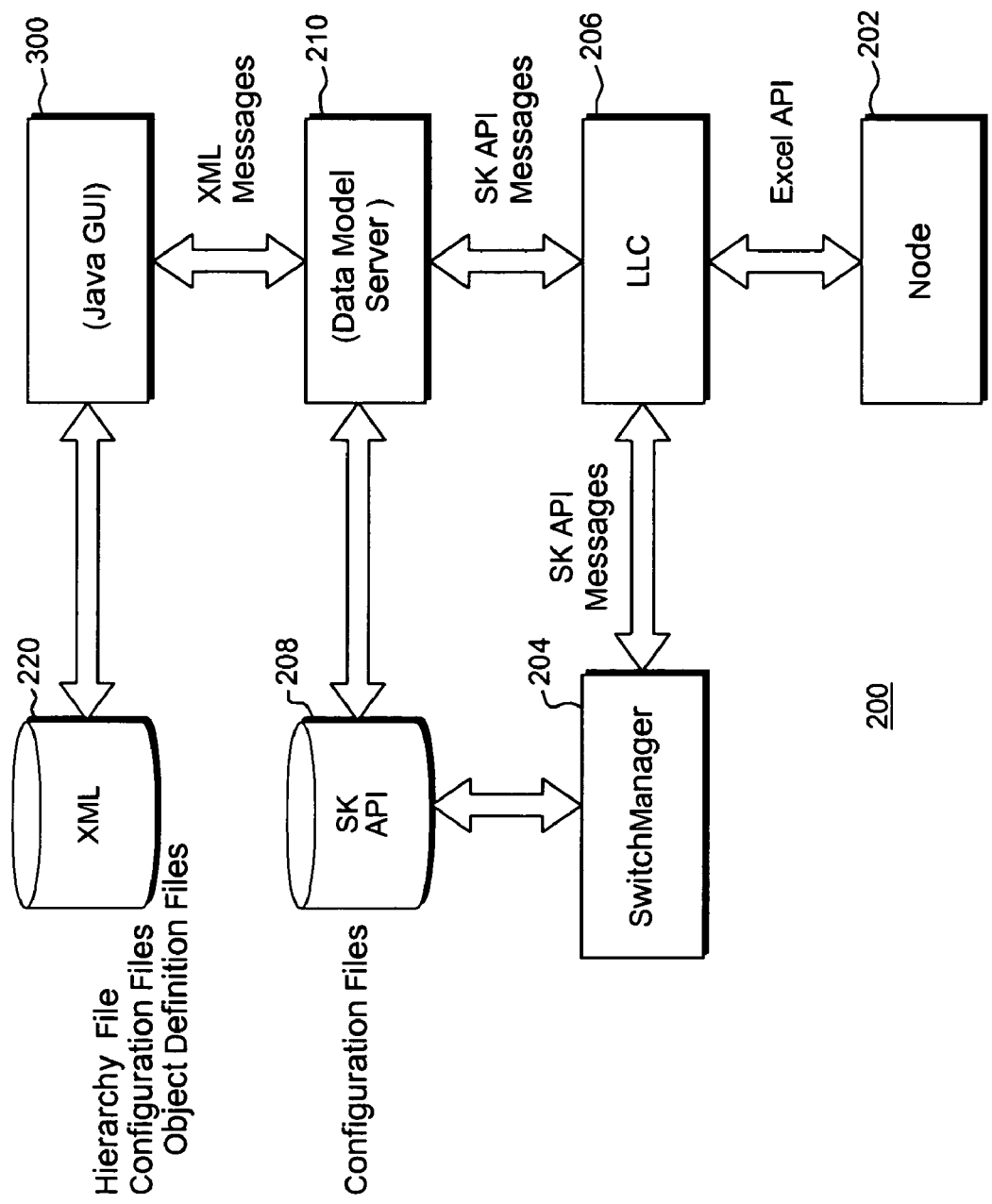
FIG. 2 is a block diagram of a node in a telecommunications system and associated software program that can be configured, monitored and updated in accordance with one embodiment of the present invention.

Referring to FIG. 2, a telecommunications environment 200 includes a node 202. The node 202 is to be configured and monitored in accordance with the present invention. The node 202 may be an integrated media gateway, a media services platform, or another telecommunications services node which provides telecommunications switching, enhanced services and other functionality with respect to the provision of telecommunications services.

Configuration of the node 202 is supervised and controlled by a switch manager 204 which is part of a software program, illustratively a Switch Kit™ which is available from Excel Switching of Hyannis Mass., through the LLC 206. The switch manager 204 communicates with a database containing configuration files 208. A data model server 210 stores the actual data that describes the node 202 and its operation.

In accordance with the invention, a client software engine 300 generates and provides a user interface generated in accordance with a set of XML hierarchy files, configuration files and object definition files which are stored in a storage device 220. More specifically, the client software engine 300 is illustrated schematically in FIG. 3, and it is also referred to herein as the "client 300." The client 300 contains system objects 302 which are organized by a system object manager 304. The system object manager 304 communicates with the main user interface (UI) sub-system, which uses suitable software to generate the user interface in accordance with the invention. In addition, the client 300 includes code for the generation of virtual objects 308. In addition, there is code for the generation and production of custom tables 310 and configuration wizards 312. The client 300 uses XML hierarchy files and meta-data files (system object definition files) to provide for configuration, monitoring and modification of the telecommunications system via a user interface.

Figure 4:
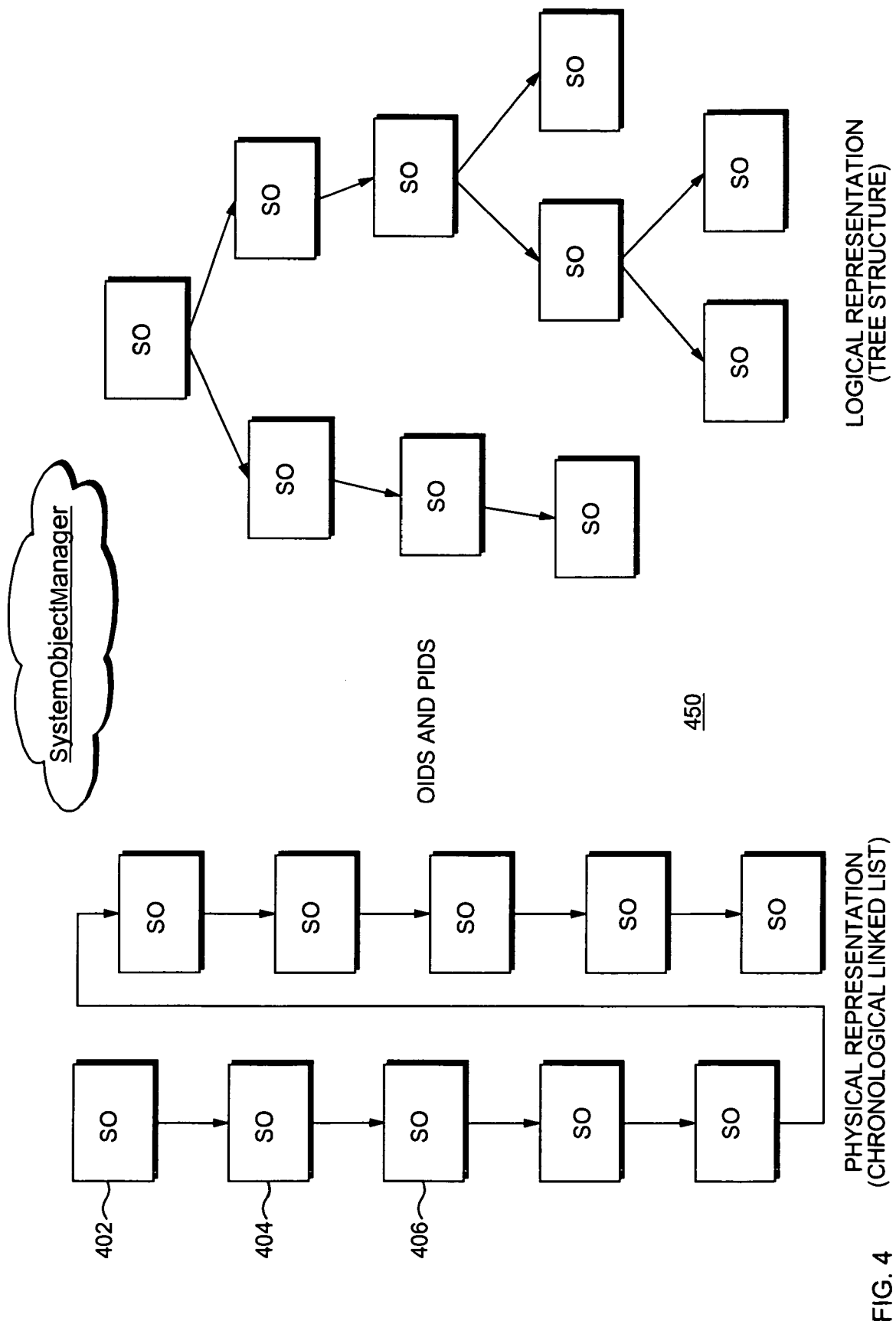
FIG. 4 is a schematic illustration of the system object manager and a physical and logical representation of the system object tree structure in accordance with an illustrative embodiment of the present invention.

As depicted in FIG. 4, the system objects are created in accordance with an order of creation set forth in the XML hierarchy file. The file determines the order of creation, and thus the tree structure 450 which is the logical representation of the telecommunications system as described by the system objects as defined in accordance with the invention. The system objects are created pursuant to a set of object rules.

Figure 5:
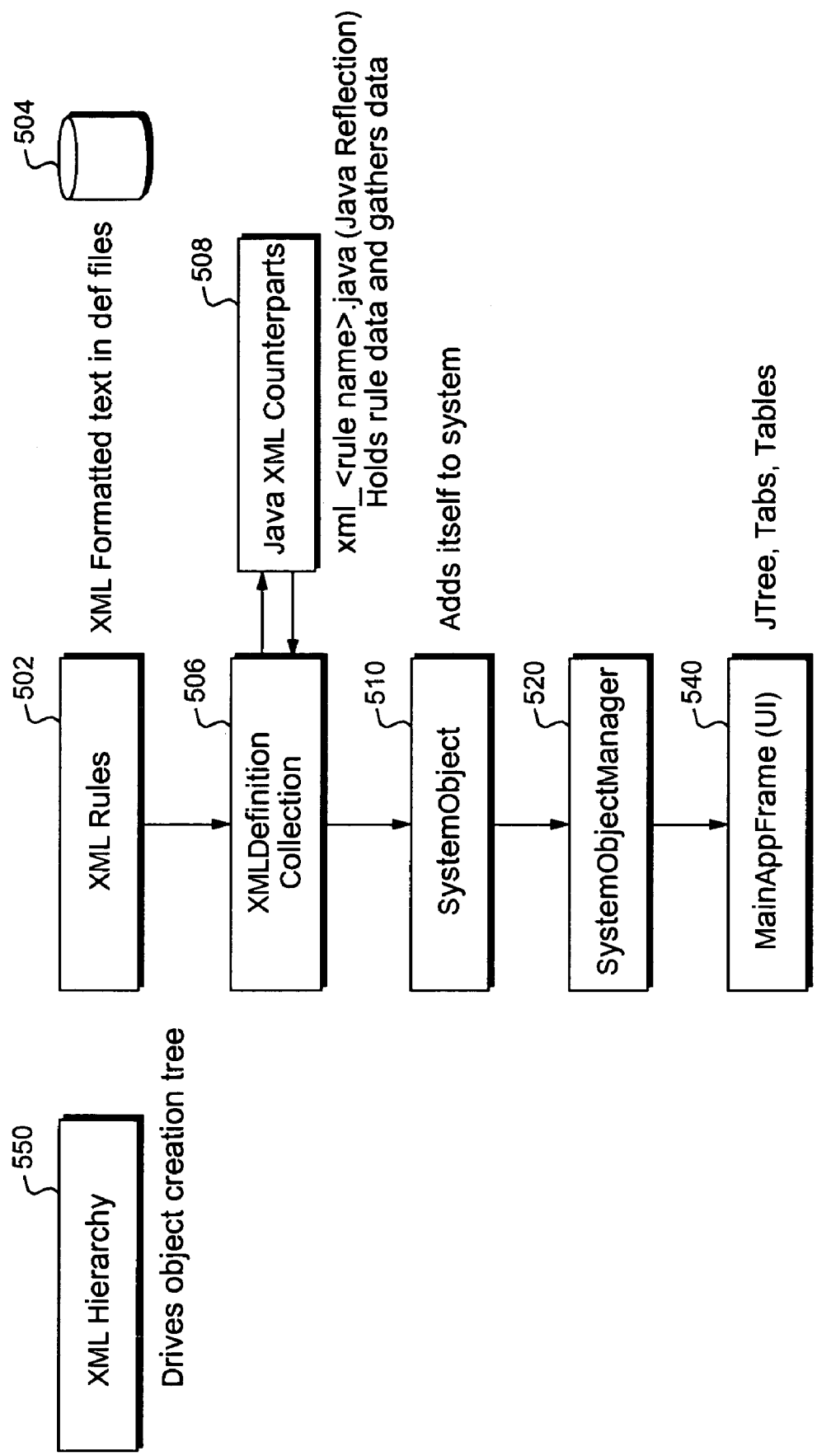
FIG. 5 is a schematic illustration of the software processes which utilize the meta-data definition files in accordance with the present invention.

As illustrated in the block diagram of FIG. 5, the XML rules 502 are contained in the meta-data definition files that are stored in a directory of the storage device 504. A software module entitled XML definition collection 506 reads the XML rules 502 and communicates with a Java XML counterpart process 508, which holds the rule data and gathers any additional data that may be needed. Thus, the XML definition collection class 506 reads the object definition file from disk 504 to create the system object thereby defined.

When creating the system objects in accordance with the process discussed with reference to FIG. 5, there is an order in which the objects are to be created. This is driven by the XML hierarchy process which controls the object creation tree. The XML hierarchy process 550 is implemented by the XML block of code 600 specified by way of example in FIG. 6. In the first line of code 602, the XML objects class name is "signaling" and it has the same display name "signaling". The configuration order of the signaling object is 5. Line 602 indicates that the object "SS7" has configuration order 6. It is noted in the line of code 614, that the object class named "H323 Signaling," has the same configuration order of 6 as the object class named "SS7" as shown in line 604. This is because these two objects would be at the same level in the object tree structure. Thus, in this way following the lines of code such as those shown by way of example in FIG. 6, the system object tree is thereby created with the correct hierarchy using the XML object hierarchy file which is stored in a storage device associated with the client engine 300 of FIGS. 2 and 3.

With respect to the creation of each individual rule object, a suitable technology, which in the illustrative embodiment of the invention is Java Reflection™, takes each XML string in the object definition file, and calls upon a class that it derives from the name of the string. The individual classes will call upon a rule that governs that particular object being created. The primary rule elements are illustrated in the table 700 of FIG. 7 in the left hand column 702, which is entitled "Main rule elements." For example, one such rule is defined as xml_cardinality.java as illustrated in the line 708 of column 702. This rule xml_cardinality.java contains source code that is then utilized by the system object module 510 with respect to the system object being created. The cardinality indicates how many descendants a particular object may have. For example, if the system object is a VoIP module, the XML rule (as processed by the XML definition collection class 506 and the Java counterpart 508) may be for example, that a VoIP module in this particular system must be one of a total number of 10 VoIP modules. Further information may also indicate available that the other 9 VoIP modules have already been assigned at that point in the creation process. This way, the administrator will know that after this assignment all ten of the VoIP modules for the system have been assigned.

Using these rules, and the XML definition collection and Java XML counterparts 506 and 508, respectively, a system object then gets created in module 510 for the telecommunications system being configured.

Thereafter, the system object module 510 notifies the system object manager 520 of its addition to the system. The system object manager then gives that particular system object a location in the tree structure 450 (FIG. 4). The new system object has thus been assigned a place in the system object tree structure 450 and can now be displayed appropriately by the main application frame process for the user interface 540.

It is also noted that there is a process for validation in the definition files to assure that the data is valid for a particular object definition. For example, the validation would assure that the data is of a certain format as appropriate for the particular item being described. For example, if one of the objects is an IP address, a gateway and a subnet mask, the client engine 300 includes XML driven validation codes that examine the three values for the IP address, the gateway and the subnet mask and makes sure that they are correct and in the appropriate format. It is noted that this process does not validate the definition file itself, it validates the actual data, and the validation process is performed through a definition file command.

Once the system objects are created, the meta-data XML definition files that describe the data also allow additional features, such as, for example, making fields "read-only," cardinality, visible rows and invisible rows, customization, helper dialogs, and application launchers (as described in further detail hereinafter.) In addition to describing the data, the meta-data definition files of the present invention also act as generators in the sense that they may generate objects and data tables through wizards. Virtual objects and custom tables can also be generated, as referred to previously with respect to FIG. 3. In accordance with an illustrative embodiment of the invention, by way of example and not of limitation, software classes that can be used to produce the user interface using the meta-data definition files in accordance with invention are: XMLDefinitionCollection, XMLHierarchy and xml_<rulename>.

XML Definition Files

For purposes of a complete description, further details about the XML definition files of the present invention will now be described. There are four main portions ("blocks") of an XML definition file: a properties block, an optional property data rules block, an objects rule block and a property overrides block. An example of the properties block is illustrated in FIGS. 8A and 8B.

Each line of code in FIG. 8A corresponds with an entry in the GUI of FIG. 8B. Code block 802 of FIG. 8A sets forth each of the properties which relate to the particular system object "SS7 Link Set 0" that is being defined. Line 804 of block 802 relates to the "Primary" property. The display name for this property is "Primary/Secondary" and this is illustrated in GUI 820 at the first line 822. This property determines whether the SS7 Link Set being configured should be the primary SS7 Link Set in the system, or instead is a redundant or secondary SS7 Link Set in the system. Each of the properties is set forth in the column 840 of the GUI 820.

The next column is the "as configured" column 842 and the right-most column 844 is the "user specified" column, which is editable. As noted, with respect to the first property, the user has configured this SS7 Link Set as the primary for this particular system configuration. The second property is the Link ID as illustrated in the line 824. The Link ID is indicated as 0. Line 808 of the code block 802 indicates that the next property is the Span. However, this has been indicated as a "non-visible property," which means that it is not shown in the user interface 820. It is noted at the far right of the line 808 that indicates visible=false, and this is useful because there are certain system object properties that the provider may determine that are not going to be visible to the user via the user interface.

The next property (line 810) is the ComponentID which has the display name of "Interface-Offset." This is shown in line 826 of the user interface 820 and in this instance, the user has specified this to be configured as Bearer-ID:0. Its visibility indicator is true, thus it is visible to the user through user interface 820. The remainder of the items in FIGS. 8A and 8B are self explanatory and can be understood with reference to the figures.

Figure 9:
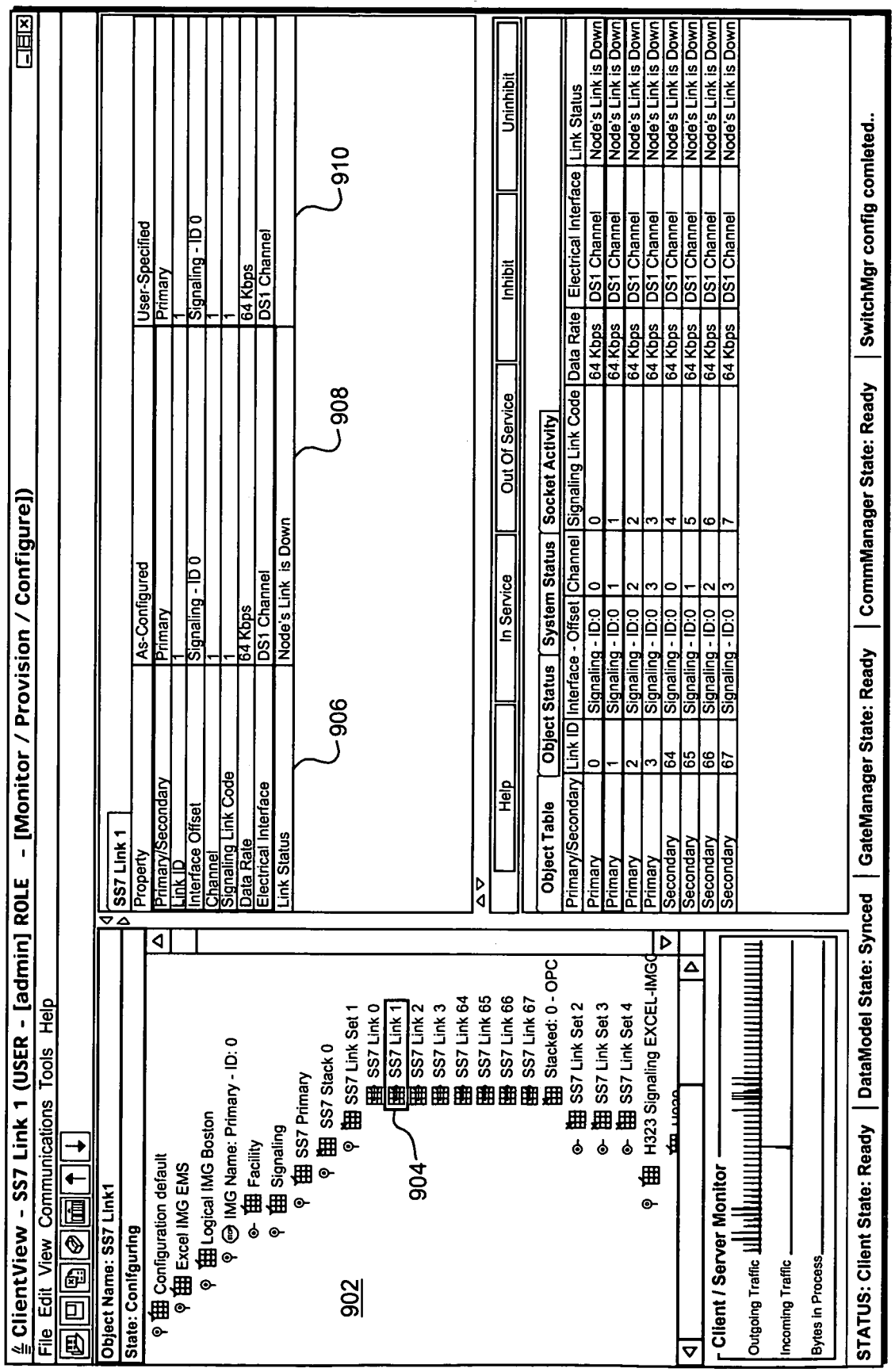
FIG. 9 is an exemplary screen shot generated in accordance with an illustrative embodiment of the present invention.
Figure 10:
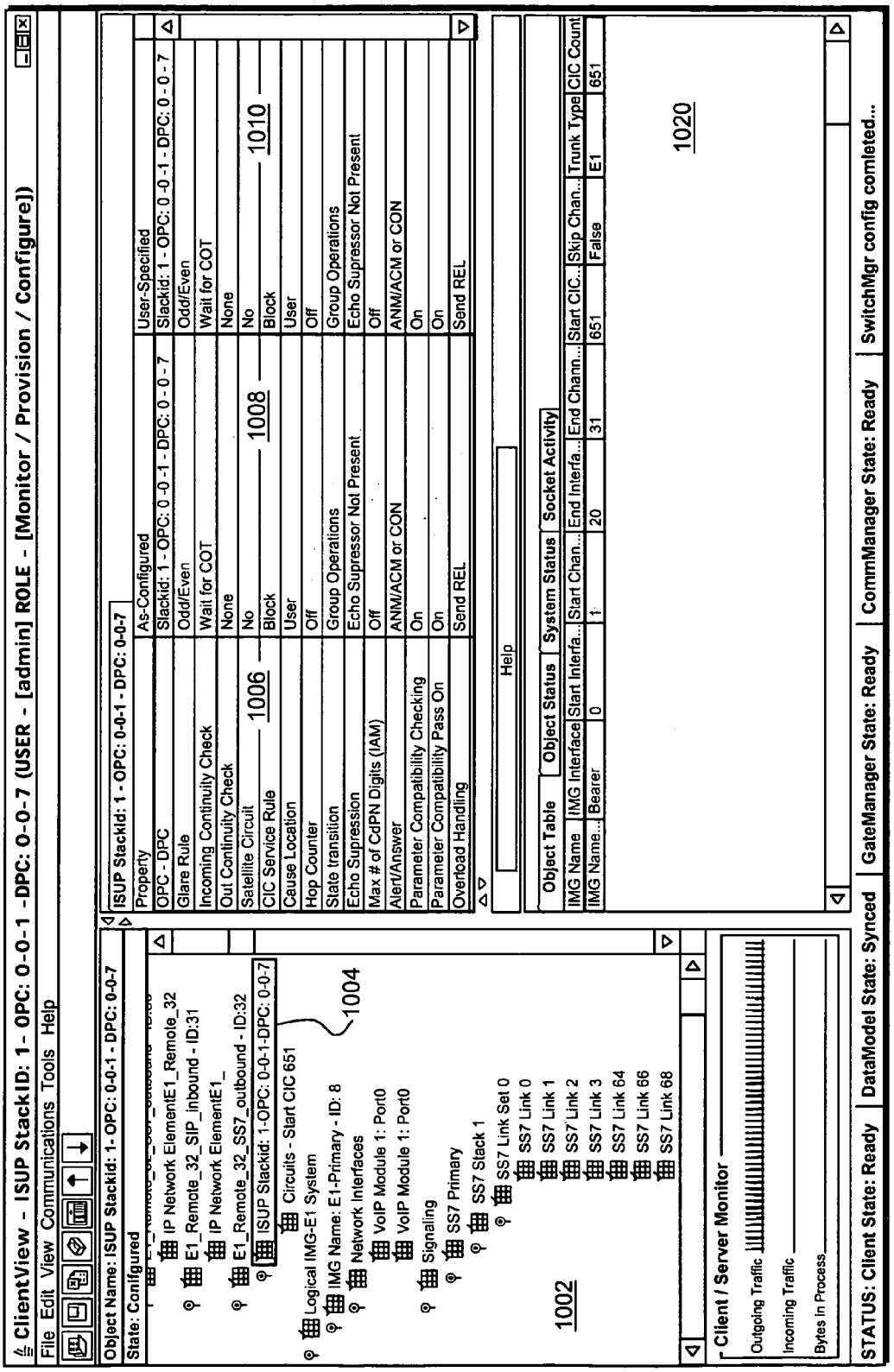
FIG. 10 is another screen shot of a user interface in accordance with an illustrative embodiment of the present invention.

Thus it can be seen that from the definition files the XML code 802 generates a user interface 820 which allows the user to configure the various properties of a particular system object using the user interface which has been generated. For a further understanding of this aspect of the present invention, two examples of a larger screen shot illustrating the Property names are shown in FIGS. 9 and 10. In the user interface screen 900 of FIG. 9, the object tree is illustrated at 902 with a list of objects with respect to this particular node are shown in hierarchical format. In the example, the object 904 is highlighted because it is being edited but has not yet been driven down to the switch. The object is the SS7 Link. The properties of the SS7 Link are illustrated in column 906. The object's live configuration items are illustrated in column 908. To edit the object's configuration, fields are selected in the user-specified column 910. The fields are editable through direct-edit, pull down boxes, or custom dialog boxes defined in the XML definition files, as described further hereinafter.

Similarly, the user interface 1000 of FIG. 10 shows the object tree 1002. In this example, the actual object being edited is highlighted at line 1004. The object is the "ISUP Group Stack Identification." The properties for this object are provided in column 1006. The live data is provided in column 1008. The editing area provided by the XML definition files of the present invention, is set forth in column 1010.

The bottom right window of the user interface 1000 provides a custom table 1020. This custom table 1020 is generated by instructions in the XML definition files of the present invention for circumstances in which it may be helpful for the user to have additional data available when configuring or monitoring a particular system object. For example, in the window 1020, the table is programmed to display all child circuit objects, but in the illustrative example, there is one child circuit object.

Figure 11:
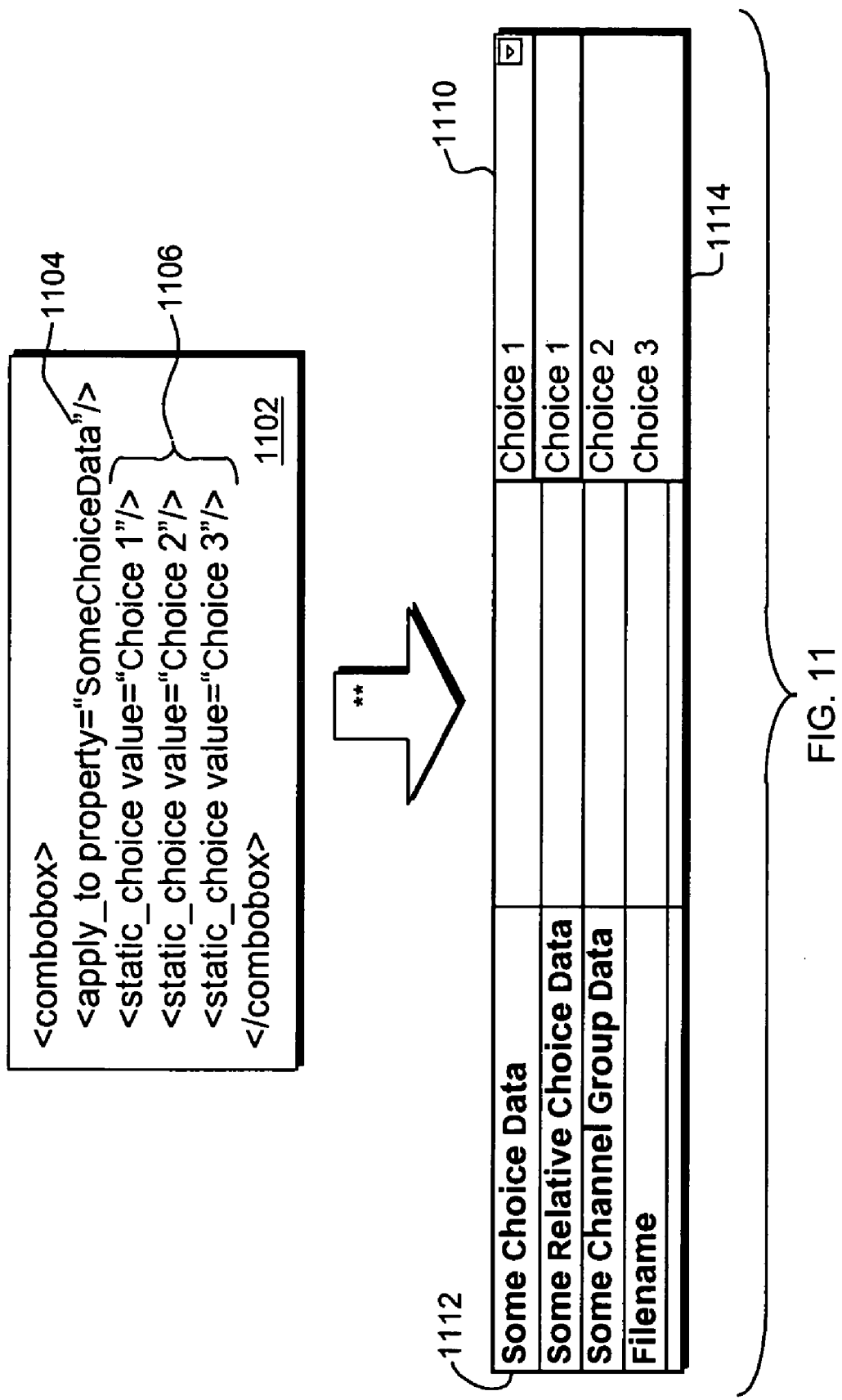
FIG. 11A is a schematic illustration of a block of code with respect to definition files in accordance with the present invention for creating a static combo box in accordance with the present invention.
FIG. 11B is a portion of a user interface static combo box generated by the code of FIG. 11A.

As noted before, a second aspect of the XML definition files are the optional property data rules. These data rules generate helpful tools for the user to employ when making initial configuration decisions and subsequent modifications for each property of a system object. FIG. 11 is an example of an optional property data rule that is used to generate a static combo box. The code block 1102 generates a combo box shown as 1110. For example, the XML block is called "Combo Box." It is applied to the property "Some Choice Data" as illustrated in the first line of code 1104. This is displayed in the top row 1112 of the user interface 1110. The static choice values of choices 1 through 3 are provided by the code lines 1106. The XML code instructs the user interface process to display these choices in the pull down list 1114 of the UI 1110.

Figure 3:
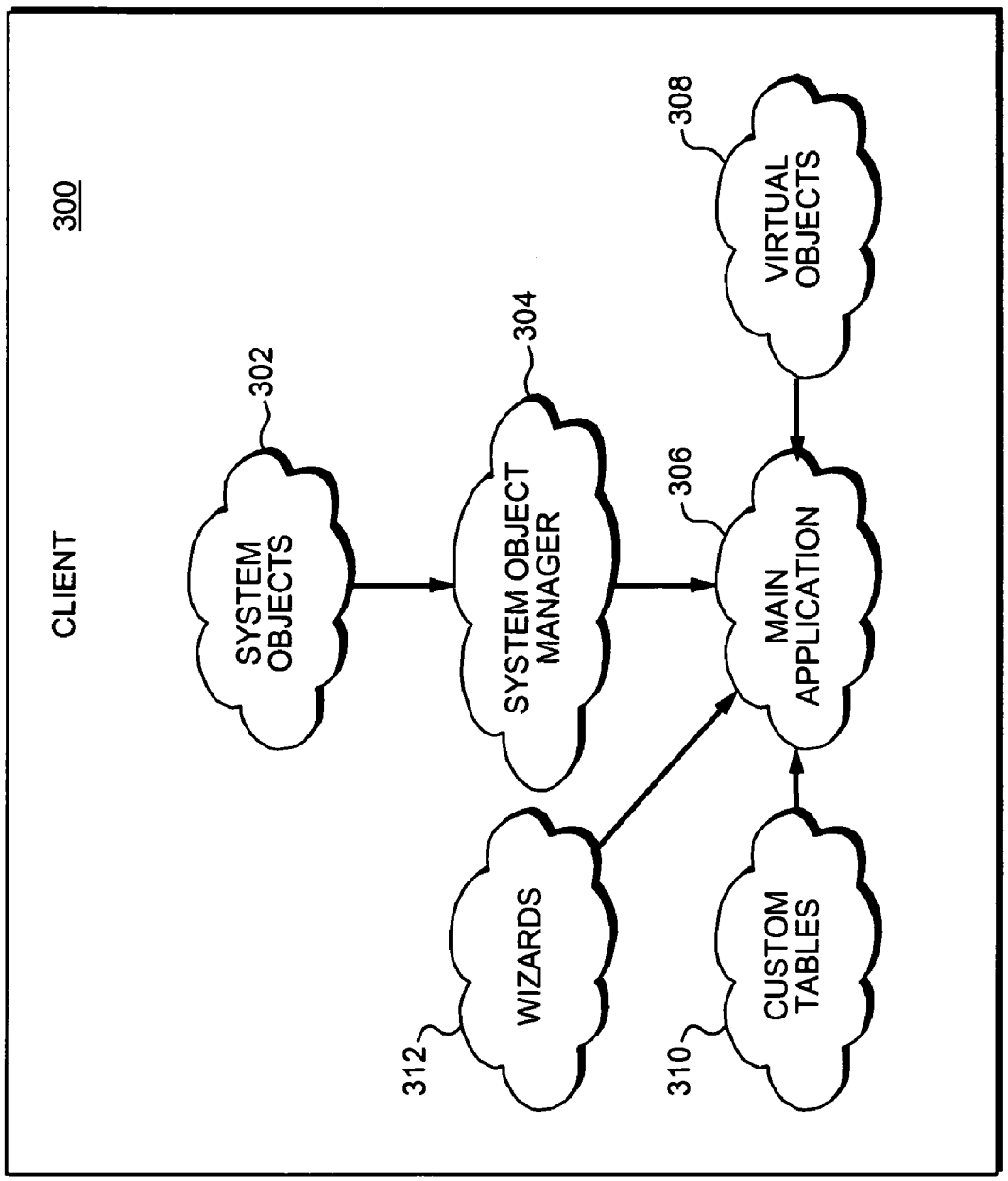
FIG. 3 is a schematic illustration of the software engine for generating a client user interface in accordance with an illustrative embodiment of the present invention.
Figure 12:
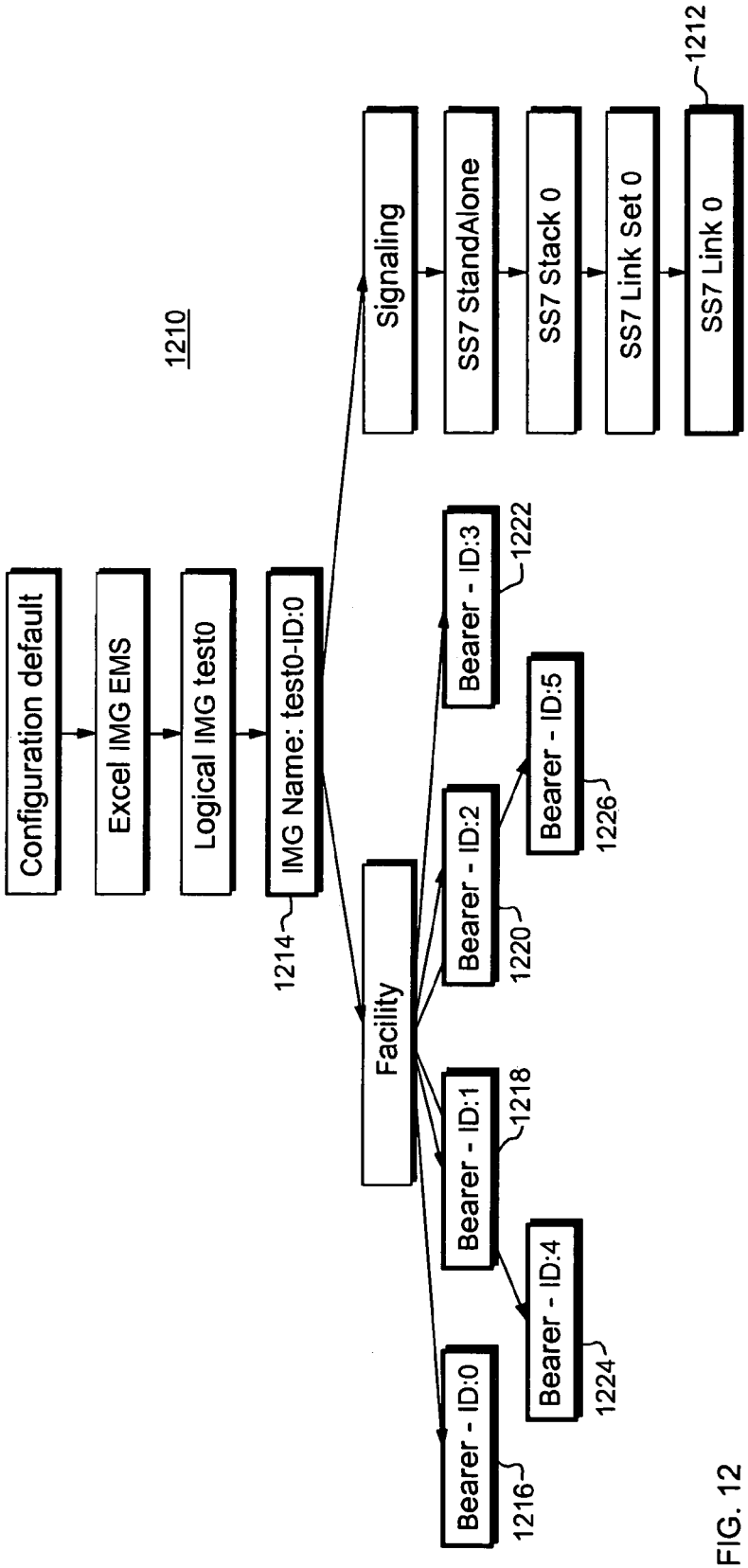

Another type of XML data rule generates a dynamic combo box. This is illustrated in FIG. 12. An example of the code is provided in the code block 1202. This XML rule relates to the "SS7 Link Object." It applies to the ComponentId field, as indicated in line 1204 of the code box 1202. This XML rule instructs the engine to go to the system object tree which is maintained by the system object manager 304 (FIG. 3). A portion of the tree is illustrated in FIG. 12 in tree structure portion 1210. The XML rule instructs the engine to begin at the system object of interest, which is the "SS7 Link 0" in node 1212, to follow the tree structure up to the node object 1214. The data rule further instructs the server to retrieve all objects which satisfy the class stated, which is the TDM-DS1 class. These are illustrated in the node blocks 1216 through 1226. The dynamic combo box data rule provides that the objects that satisfy the stated criterion should be retrieved by the system object manager 304 (FIG. 3) and should be displayed in a combo box for the Component Id property.

The resulting combo box is illustrated in FIG. 13. The XML code in the definition file with respect to the dynamic combo box data rule is repeated for convenience in the block 1302. The TDM-DS1 items in the tree, as set forth in block 1304, are displayed in user interface 1306. More specifically, the property is "ComponentId" which has the display name "Interface-Offset" as shown in line 1310 of the UI 1306. In this line 1310, it can be seen that the combo box 1308 has been generated and it sets forth the particular entities that satisfy the TDM-DS1 requirement from the XML code shown in block 1302.

Figure 14:
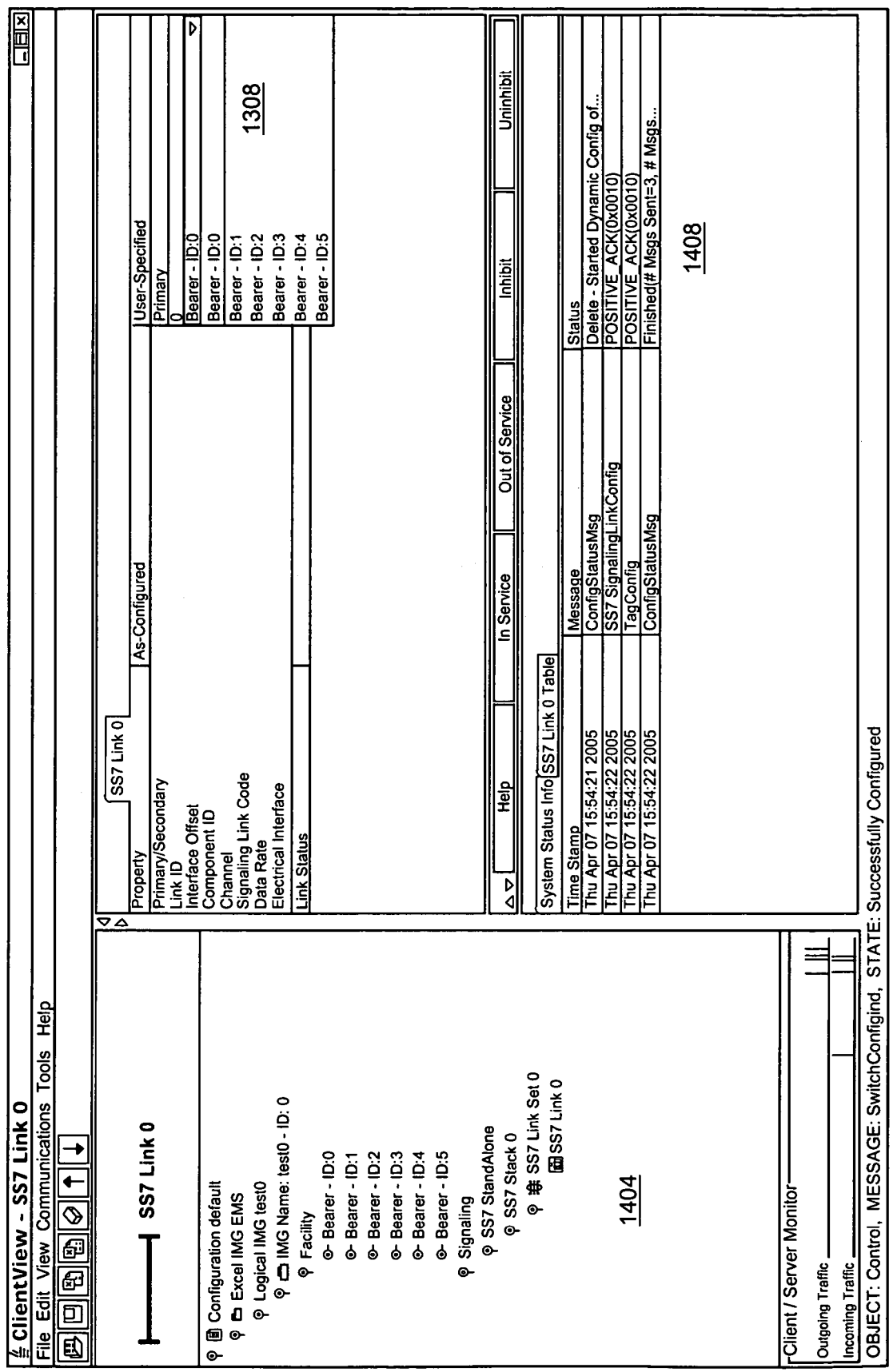

A full screen shot including this dynamic combo box is illustrated in FIG. 14. The full screen shot shows the combo box 1308 but also shows on the left hand portion of the user interface in its place within an object tree portion as shown in window 1404. A custom table 1406 is also generated to provide time stamped system status information which may be helpful to the system administrator when to configuring the SS7 Link 0 object.

Figure 15:
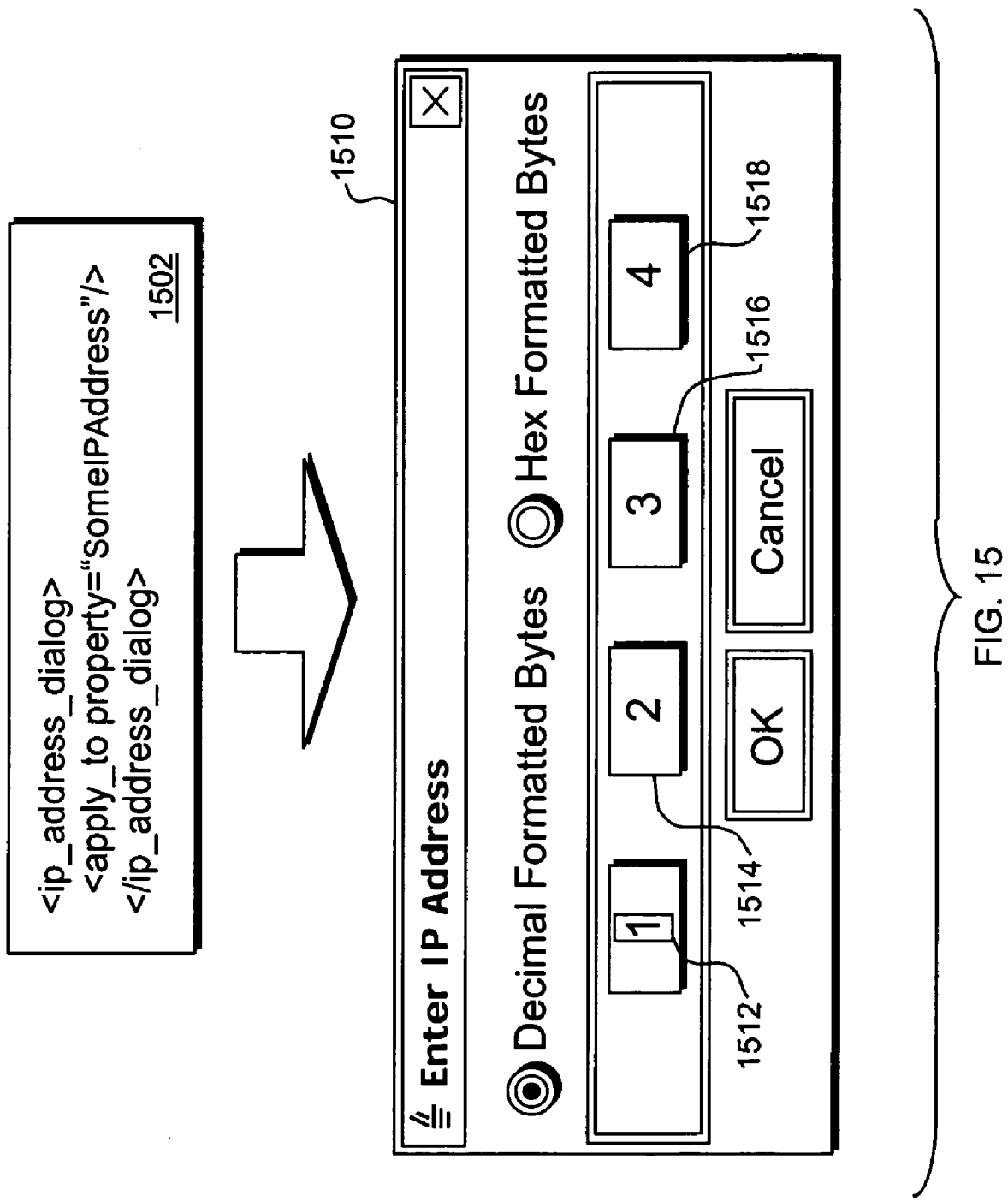
FIG. 15 is an example of the XML code and graphic user interface for an IP address helper dialog in accordance with the present invention.

Another example of an XML data rule in accordance with the present invention is illustrated in FIG. 15. This data rule relates to generating an IP address helper dialog box. The code block 1502 instructs the JAVA software process to generate the user interface 1510. The user interface 1510 allows entry of an IP address, in that it sets forth the individual decimal formatted byte blocks 1512 through 1518, which can be edited appropriately by the user. This data is then stored in the cell associated with the "SomeIPAddress" property.

Figure 16:
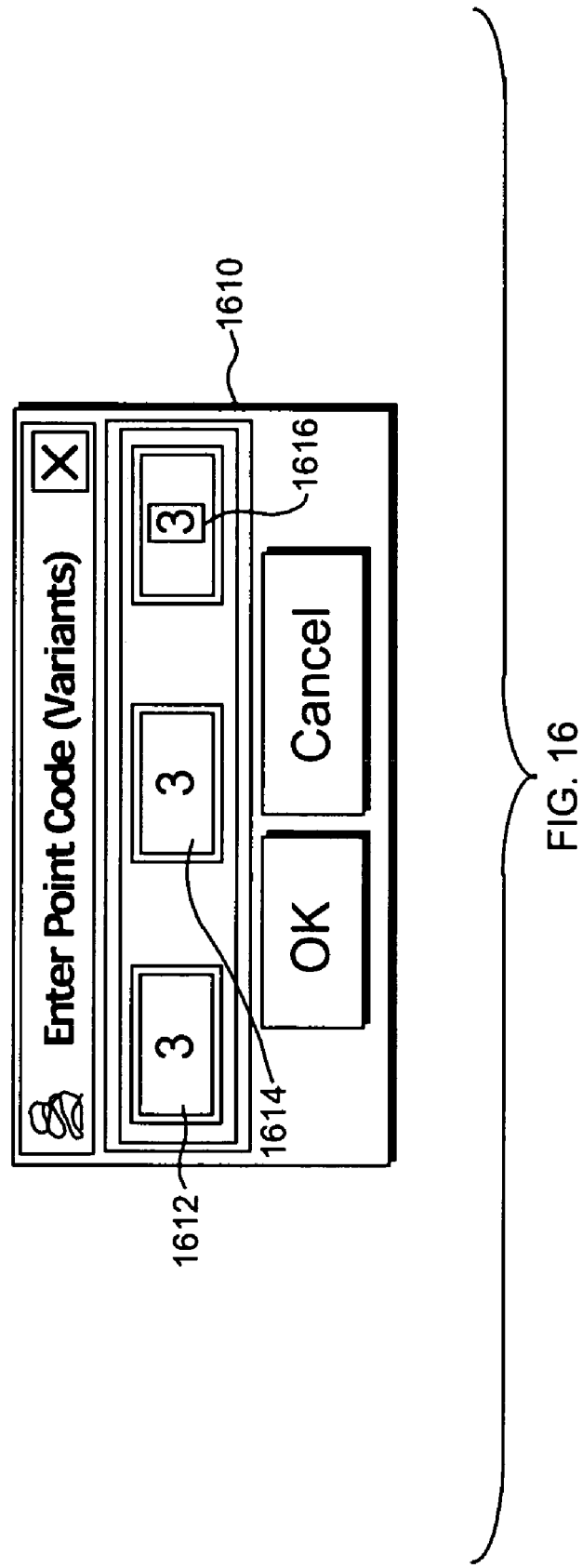
FIG. 16 is an example of the XML code and graphic user interface for a point code helper dialog box in accordance with the definition of files of the present invention.

FIG. 16 illustrates an XML data rule generating a point code helper dialog as shown in the dialog box 1610, in accordance with the code block 1602. Dialog box 1610 is provided with three editable portions 1612 through 1616 and the user can enter the particular point code required. Furthermore, using a definition file VariantFormats.def in accordance with the invention, the particular variant for the point code is enforced. If a different property were specified, a different variant could be involved in which case the point code helper dialog box would enforce conformance with that variant. In this way, the definition files of the present invention can dynamically adjust the user interface validation rules during run-time to accommodate different variants, without requiring hard-coding of each particular variant that may arise in the configuration of the system.

Figure 17:
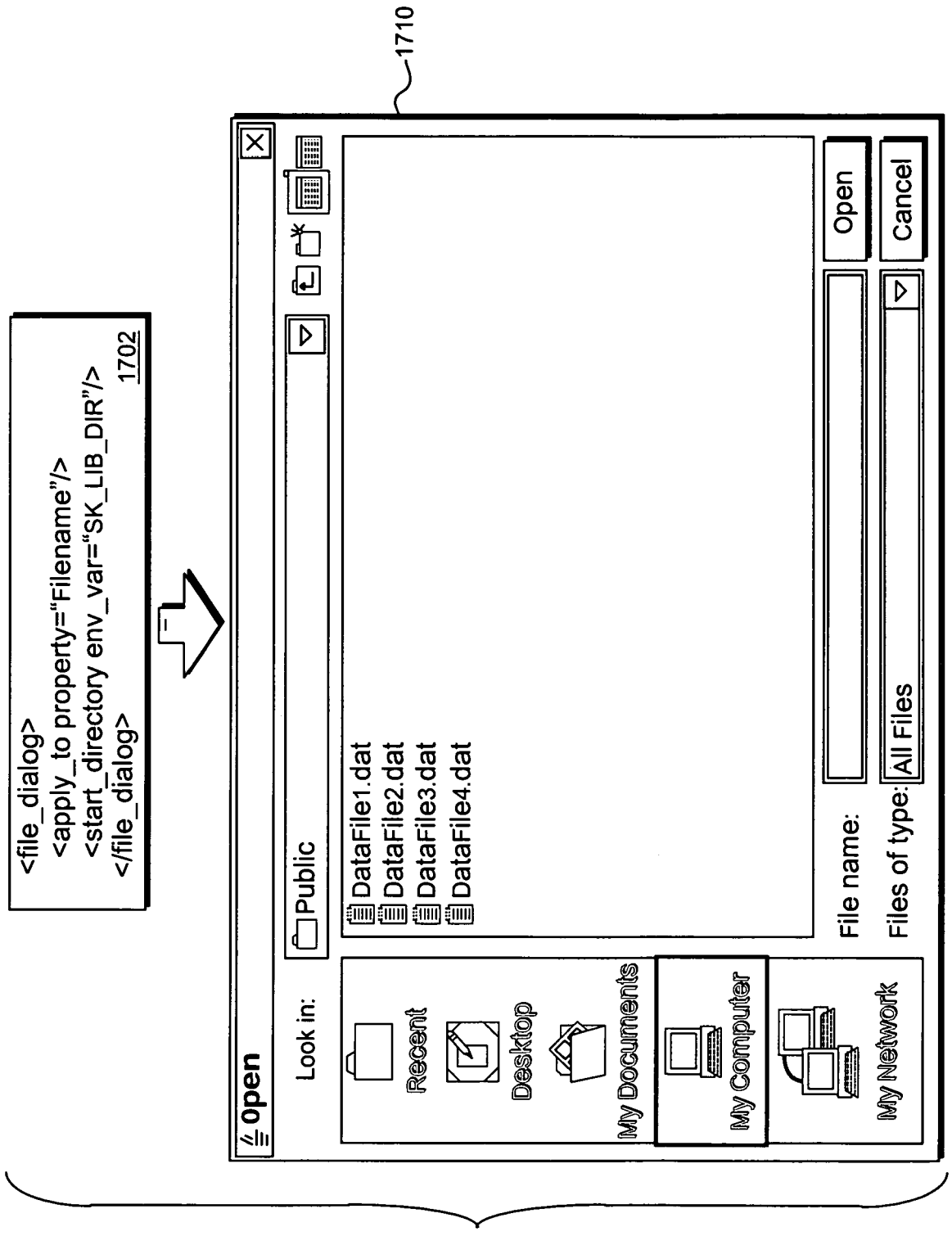
FIG. 17 is an example of the XML code and portion of a graphic user interface for a file chooser helper dialog box in accordance with the definition files of the present invention.
Figure 18:
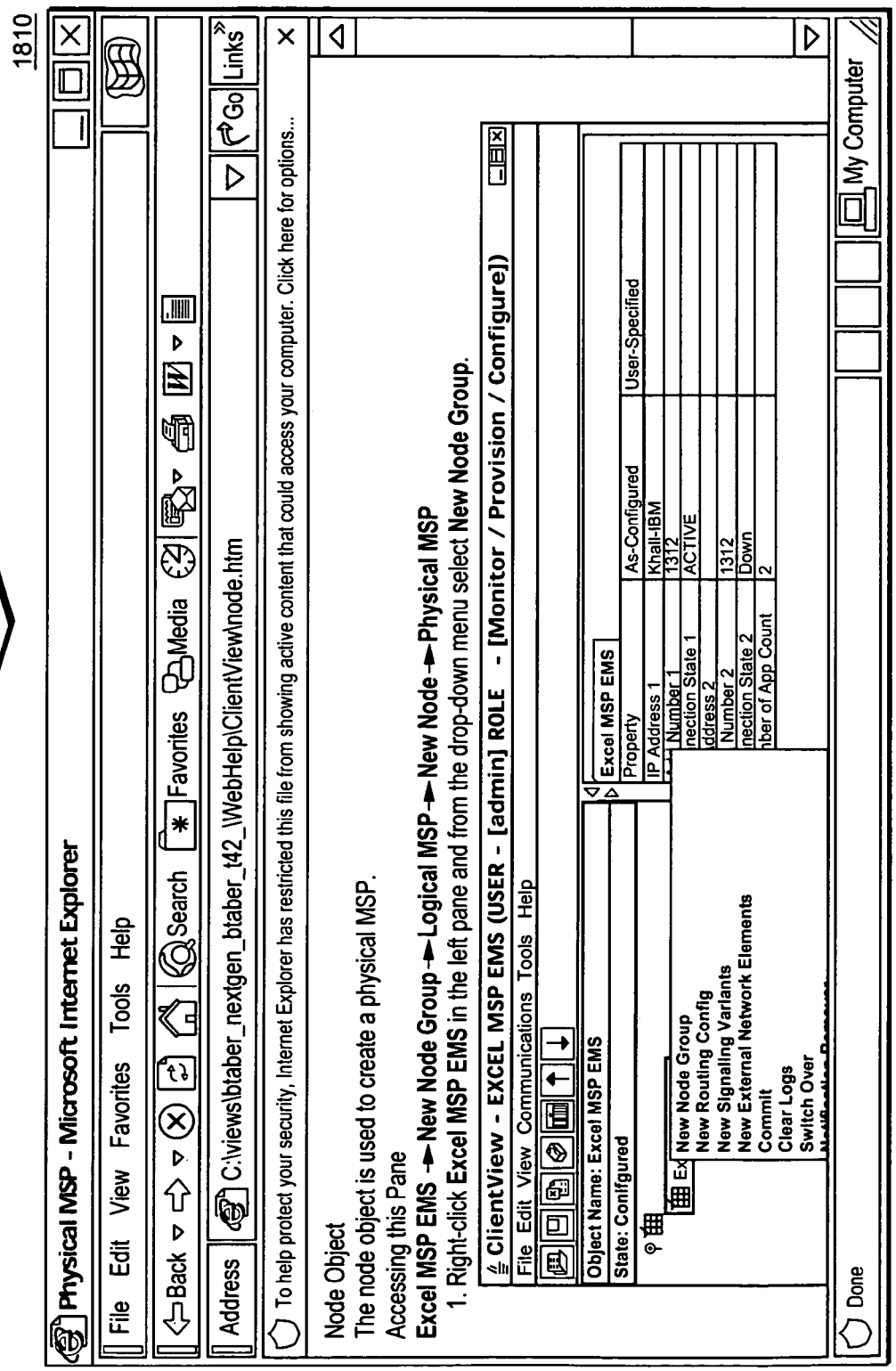
FIG. 18 is an example of the XML code and resulting graphic user interface when generating a browser application in accordance with the definition files of the present invention.

Another one of the optional property data rules that is set forth in the XML definition file of the present invention, generates a file chooser helper dialog. This is illustrated in FIG. 17. The code block 1702 instructs the engine to generate the user interface 1710. The file dialog XML instruction applies to the property "Filename" and points to the directory named in the environment variable SK_LIB_DIR This command instructs the user-interface to retrieve the files in that particular directory and present in the user interface 1710.

The next optional property data rule set forth in the XML definition files of the present invention is a browser helper application. In this instance, the user is referred to a URL for further information with respect to a particular item being configured. The code block 1802 instructs the engine to refer to a URL which then connects to the user's Internet browser and links to the stated URL so that the user can view that website for further information, as illustrated in the screen shot 1810.

As discussed previously, a third aspect of the XML definition files are object rules. Object rules apply to the whole object, not just an individual property as in those previously described. An object rule can be a constraint, such as "cardinality." For example, in the code block 1902 of FIG. 19, the cardinality of a particular object states that it will have the seven descendent classes noted including media, network interfaces, facility, signaling, radius client, timing synch priority list and license info. These each have a maximum of one item.

Figure 20:
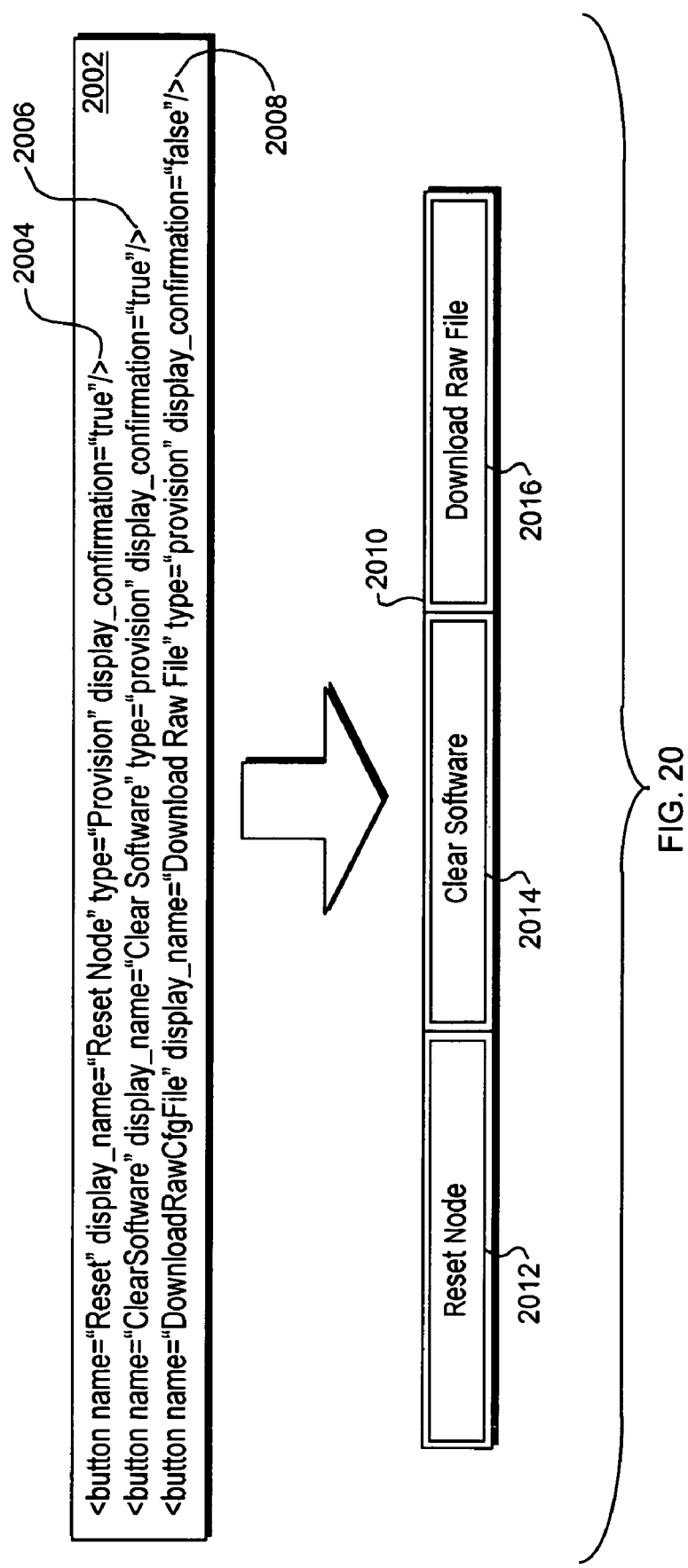
FIG. 20 is an example of the XML code for property action buttons in accordance with an object rule of the present invention.

In accordance with a further aspect of the invention, an object rule can be used to provide a provisioning button. This is illustrated in FIG. 20. Provisioning buttons, such as the reset node button 212, send a message to the server instructing it to, for example, reset the node. This instruction is not requesting data, it is a provision which commands the server to perform some particular action, such as bringing a node into service or taking a particular node out of service, for example. These rules do not apply to a specific field, they apply to the object itself.

The XML code for implementing the provisioning button features are shown in the code block 2002. This XML object rule generates a graphical button as set forth in the UI portion 2010. For example, the first provision button is generated by the code 2004 and it is a reset node button as shown in 2012. The second provision button is generated by the code 2006 and it is a clear software button as shown in 2014. The third exemplary provision button is generated by the code 2008 and it is the download raw file property button 2016.

The final aspect of the XML definition files of the present invention are property overrides. By way of example, as illustrated in FIG. 21, an attribute override is applied to the property "PeerLogicalNodeId." If the condition that ancestor class SS7's RedundancyConfig property is "StandAlone" the program designates that property as read-only and sets the default value to a blank string. If the condition that ancestor class SS7's RedundancyConfig property is "Secondary" the property is designated as read-only and the default value is set to a blank string. In this way, certain system objects can have their fields overridden through the XML definition files based on other set values of other attributes.

With respect to the property overrides set forth in FIG. 21, these overrides will enforce new data when another value changes. For example, if a span is changed from T1 to E1, the override will be executed and change other property values to correspond to an E1 line as opposed to a T1 line. This can be done automatically without a programmer needing to hard code this behavior in Java™.

Interprocess Communication

Figure 22:
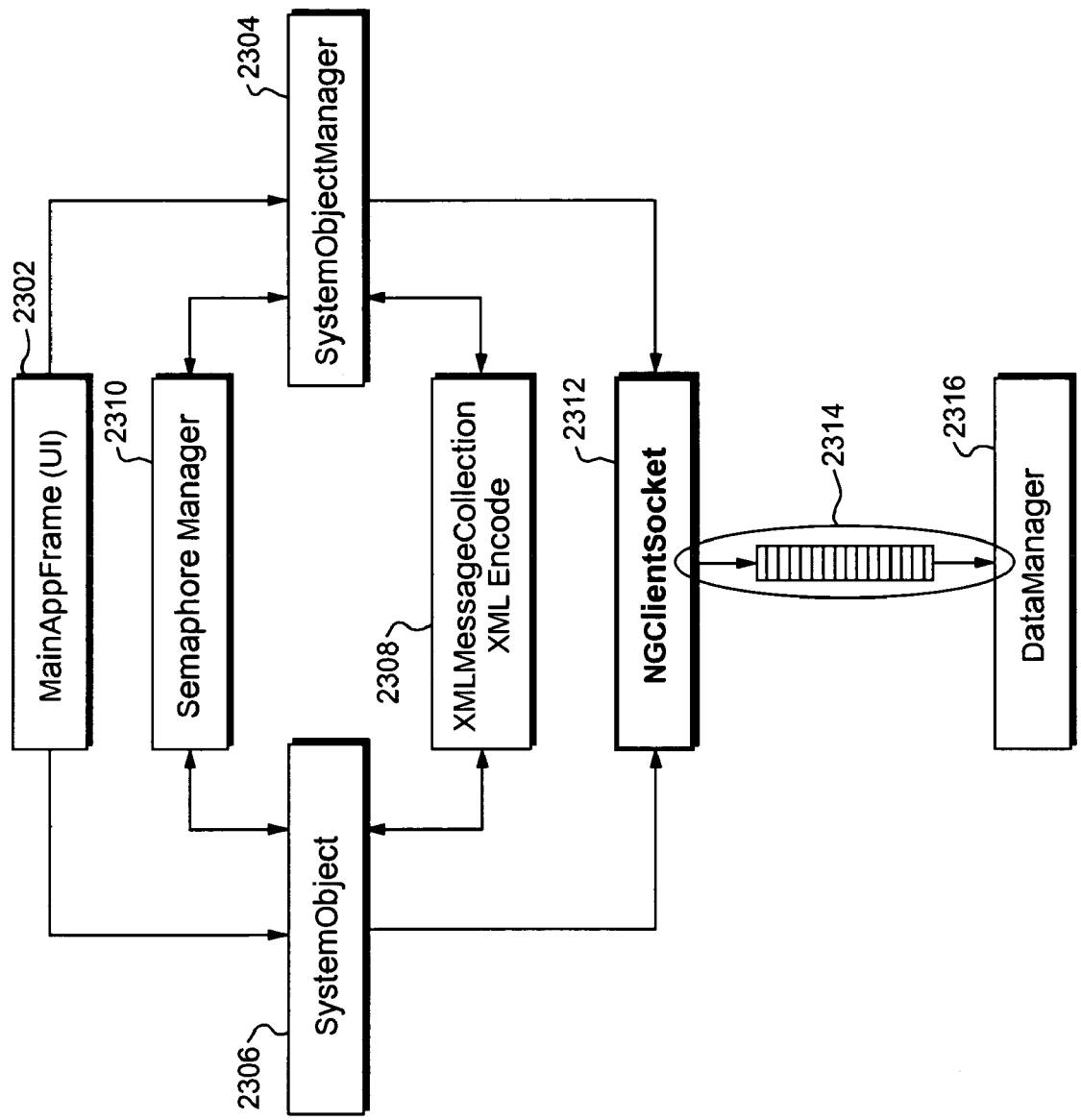
FIG. 22 is a schematic block diagram of the interprocess messaging in accordance with the present invention for outgoing messages from the client software to the data manager of the telecommunications device that is the subject of the user interface.
Figure 23:
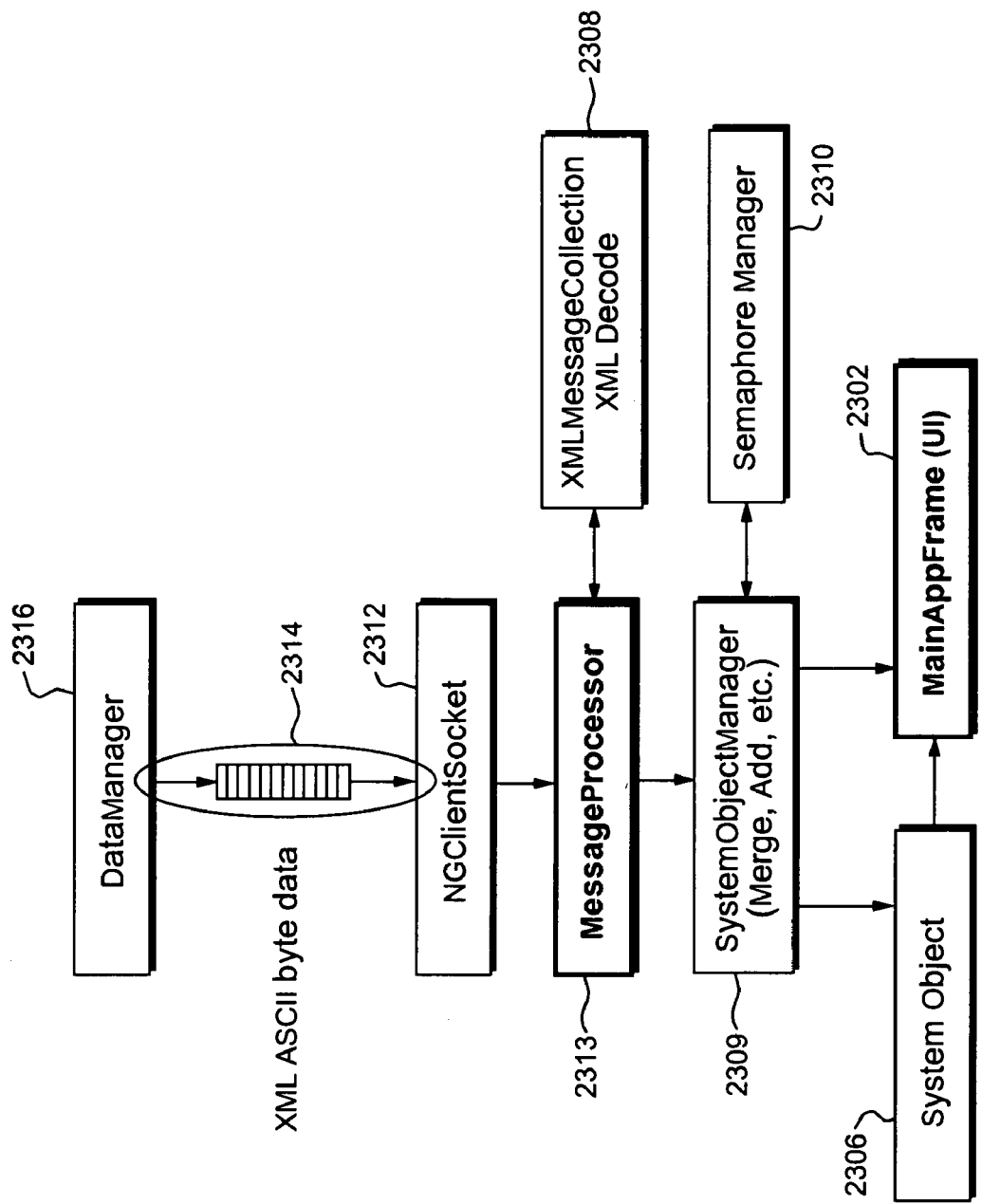
FIG. 23 is a schematic block diagram for an incoming interprocess communication message from the server to the client that generates the user interface in accordance with the present invention.

As noted, the XML definition files define data from the server associated with the system. In accordance with the present invention, the interprocess communication for this purpose is illustrated in FIGS. 22 and 23. With respect to FIG. 22, when an object is edited in the main application frame user interface 2302, it is directed either to the system object manager 2304, or to a particular system object 2306. Assuming that the instruction relates to a particular system object, the user makes a particular selection or a request and this is sent to the XML collection process 2308, which encodes the XML and sends that back to the system object 2306. If this is a blocking request, a semaphore is requested from the semaphore manager 2310, and this is used to block any action from the user until the server has acknowledged the request. This is to ensure that an acknowledgement is received prior to introducing a new object or making a new change, for example. The encoded request is then passed to the NG client socket 2312 which transmits the data 2314 to the data manager on the server 2316.

Similarly, as shown in FIG. 23, when the server is to send data to the user, the data manager 2316 sends data formatted as XML ASCII byte data 2314 to the NG client socket 2312 of the client engine of the present invention. A message processor 2313 passes the message to the XML message collection process 2308 which decodes the XML and passes the decoded message back to the message processor 2313. The decoded message is sent to the system object manager which merges or adds the information into the system object 2306. If appropriate, a semaphore is released if one was associated with the server response message in accordance with the semaphore manager 2310. If applicable, the information is then displayed in the user interface of the main application frame 2302.

It should be understood that the invention thus provides a straightforward data driven environment which has consistent data presentation across all objects. The system and method of the present invention is based upon XML meta-data files which are used to define the objects, customize data choices and enforce relationships with other configuration objects. The files are run-time editable and do not require recompilation, thus minimizing system downtime. Context sensitive help is available and the invention provides complete configuration support. It is an open development tool that does not require laborious hard coding for defining a configuration of a telecommunications system.

While the invention has been particularly shown and described with reference to preferred embodiments thereof, it will be understood by those skilled in the art that various changes in form and details may be made therein without departing from the spirit and scope of the invention. Furthermore, the terms and expressions that have been employed are used as terms of description and not of limitation. There is no intention in the use of such terms and expressions, of excluding any equivalents of the features shown and described or portions thereof. It is recognized that various modifications are possible within the scope of the invention claimed.

What is claimed is:

1. A system for providing a user interface for use with a node in a telecommunications system, comprising:
   (A) a set of XML meta-data definition files describing a plurality of system objects which together form a representation of the node of the telecommunications system, which files include a set of rules that include object rules and data rules;
   (B) an XML based hierarchy file that determines the order of creation of each system object; and
   (C) a client software engine configured to read said meta-data definition files to generate and display associated system objects in a graphical user interface to permit attributes of said system objects to be edited in accordance with the set of rules of said meta-data definition files.

2. The system for providing a user interface as defined in claim 1 wherein one of said meta-data definition file has instructions for generating a static combo box which allows static choices with respect to properties of a desired system object.

3. The system for providing a user interface as defined in claim 1 wherein one of said meta-data file has instructions for generating a dynamic dialog box which searches a system object tree for particular instances of a selected property attribute.

4. The system for providing a user interface as defined in claim 1 wherein one of said meta-data file has instructions for generating an IP address dialog box.

5. The system for providing a user interface as defined in claim 1 wherein one of said meta-data file has instructions for generating a point code dialog box.

6. The system for providing a user interface as defined in claim 1 wherein one of said meta-data file has instructions for generating a file chooser dialog box.

7. The system for providing a user interface as defined in claim 1 wherein one of said meta-data file has instructions for generating a browser linked to a specified URL.

8. The system for providing a user interface as defined in claim 1 further comprising object rules that can require that a command be sent to an associated server of a telecommunications system.

9. The system for providing a user interface as defined in claim 1 wherein a command can be sent to said server using a provision button generated by the client engine.

10. The system for providing a user interface as defined in claim 1 wherein one of said meta-data file has instructions for introducing property overrides to automatically change configuration data when another edit is made requiring the data to be changed.

11. The system for providing a user interface as defined in claim 1 wherein one of the rules in the set of rules generates a wizard which allows automatic creation of configuration objects.

12. A method of developing a computer program for configuring a telecommunications system, comprising the steps of:
   defining components and features of said system as individual system objects;
   using XML, describing each system object as a separate file that includes an object description and a data description;
   assigning each system object one or more properties as attributes; and
   providing a user interface such that the user can review and select choices for one or more properties associated with a particular system object.

13. The method as defined in claim 12 further comprising the step of:
   enforcing dependencies among objects.

14. The method as defined in claim 12 further comprising the step of:
   providing a graphical user interface which displays selected system objects and allows attributes of said system objects to be edited by a user.

15. The method as defined in claim 12 further comprising the step of:
   providing a graphical user interface which allows the user to send commands to a server associated with said telecommunications node.

16. A non-transitory computer readable medium for configuring, monitoring and updating a telecommunications system, including program instructions for performing the steps comprising:
   defining components and features of said system as individual system objects;
   using XML, describing each system object as a separate file that includes an object description and a data description;
   assigning each system object one or more properties as attributes; and
   providing a user with an interface such that the user can review and select choices for one or more properties associated with a particular system object to configure said system objects for the telecommunications system.

17. The computer readable medium for configuring, monitoring and updating a telecommunications system as defined in claim 16 including the further process of providing an interprocess communication mechanism for sending data between the user interface to a server associated with said telecommunications system.

18. A system for configuring, monitoring and updating a device in a telecommunications system, comprising:
- an XML parsing module including an engine for providing a client user interface;
- a system object constraint that includes object definition instructions and data definition instructions for defining each system object in the particular telecommunications system being monitored and configured;
- a system object that stores the hierarchical connectivity between system objects and provides a mechanism for locating a particular system object;
- an XML message collection subsystem that encodes outgoing XML messages from the client via said user interface to a server associated with said device in said telecommunications system, and decodes incoming XML messages from the server to the client via said user interface; and
- a client socket for physically interfacing with the telecommunications system servers.

19. The system as defined in claim 18 further comprising a semaphore manager for introducing a semaphore that blocks user activity until a specified time elapses or event occurs.

20. The system as defined in claim 18 wherein said telecommunications system device is one part of an integrated media gateway or a media services platform.

* * * * *